United States Patent
Yoo et al.

(10) Patent No.: US 10,715,374 B2
(45) Date of Patent: Jul. 14, 2020

(54) LONG RANGE (LORA) COMMUNICATION SYSTEM AND METHOD WITH IMPROVED DATA RATE

(71) Applicant: Pusan National University Industry-University Cooperation Foundation, Busan (KR)

(72) Inventors: Young-Hwan Yoo, Busan (KR); Sungryul Kim, Yangsan-si (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 20 days.

(21) Appl. No.: 16/701,046

(22) Filed: Dec. 2, 2019

(65) Prior Publication Data

US 2020/0112470 A1 Apr. 9, 2020

Related U.S. Application Data

(62) Division of application No. 16/226,549, filed on Dec. 19, 2018, now Pat. No. 10,530,628.

(30) Foreign Application Priority Data

Sep. 21, 2018 (KR) .................. 10-2018-0113970

(51) Int. Cl.
*H04L 27/26* (2006.01)
*H04B 17/336* (2015.01)
(Continued)

(52) U.S. Cl.
CPC .......... *H04L 27/2676* (2013.01); *H04B 1/69* (2013.01); *H04B 17/318* (2015.01);
(Continued)

(58) Field of Classification Search
CPC . H04L 27/2676; H04L 5/0055; H04L 27/103; H04W 56/001; H04W 4/80;
(Continued)

(56) References Cited

U.S. PATENT DOCUMENTS

| | | | |
|---|---|---|---|
| 9,927,512 B2 | 3/2018 | Rowe et al. | |
| 2003/0039300 A1* | 2/2003 | Anglin, Jr. ............... | H04B 1/69 375/139 |

(Continued)

FOREIGN PATENT DOCUMENTS

| | | | |
|---|---|---|---|
| KR | 101034949 B1 | 5/2011 | |
| KR | 101040799 B1 | 6/2011 | |

(Continued)

*Primary Examiner* — Fitwi Y Hailegiorgis
(74) *Attorney, Agent, or Firm* — Cantor Colburn LLP

(57) ABSTRACT

A Long Range (LoRa) communication system with an improved data rate and method thereof are provided. When a packet to be transmitted is received, a transmission device determines a transmission scheme. When the determined transmission scheme is an enhanced transmission scheme, the transmission device transmits a preamble signal indicating that a packet is to be transmitted using the enhanced transmission scheme, converts n-th data of the packet to an up-chirp signal, converts (n+1)-th data of the packet to a down-chirp signal, generates a transmission signal by adding the n-th data converted to the up-chirp signal and the (n+1)-th data converted to the down-chirp signal, and transmits the transmission signal to a reception device.

7 Claims, 11 Drawing Sheets

(51) Int. Cl.
  *H04W 56/00* (2009.01)
  *H04L 5/00* (2006.01)
  *H04B 1/69* (2011.01)
  *H04L 27/10* (2006.01)
  *H04W 4/80* (2018.01)
  *H04B 17/318* (2015.01)

(52) U.S. Cl.
  CPC ......... *H04B 17/336* (2015.01); *H04L 5/0055* (2013.01); *H04L 27/103* (2013.01); *H04W 4/80* (2018.02); *H04W 56/001* (2013.01); *H04B 2001/6912* (2013.01)

(58) Field of Classification Search
  CPC ...... H04B 17/336; H04B 17/318; H04B 1/69; H04B 2001/6912
  USPC ......................................... 375/329, 133, 139
  See application file for complete search history.

(56) References Cited

U.S. PATENT DOCUMENTS

2003/0133496 A1    7/2003  Hooton
2012/0300810 A1*  11/2012  Hiscock ............... H04L 1/0002
                                                                  375/133

FOREIGN PATENT DOCUMENTS

KR          101126441 B1    3/2012
KR          101837684 B1    3/2018

\* cited by examiner

Up-chirp signal

Down-chirp signal

Up-chirp signal

Down-chirp signal

Transmission of data 0

Transmission of data 1

Transmission of data 5

Up-chirp signal to represent data 5

Down-chirp signal to represent data 5

LONG RANGE (LORA) COMMUNICATION SYSTEM AND METHOD WITH IMPROVED DATA RATE

CROSS-REFERENCE TO RELATED APPLICATION(S)

This application is a divisional of U.S. patent application Ser. No. 16/226,549, filed on Dec. 19, 2018, which claims the benefit of Korean Patent Application No. 10-2018-0113970, filed on Sep. 21, 2018, in the Korean Intellectual Property Office, the disclosure of which is incorporated herein by reference.

BACKGROUND

1. Field of the Invention

One or more example embodiments relate to a technology for increasing a data rate in a Long Range (LoRa) network environment.

2. Description of the Related Art

Recently, Internet of things (IoT) for a data exchange through a communication between objects without a human intervention is being put to practical use.

Thus, interests in a Long Range (LoRa) network are growing. The LoRa network is a wireless communication network capable of performing a long distance communication between terminals with low power and relatively low infrastructure construction costs.

FIG. 1 is a diagram illustrating a structure of a portion of a LoRa network.

Terminals 110 that use the LoRa network may periodically transmit data to a gateway 120. The gateway 120 may manage a state of each of the terminals 110 based on data received from each of the terminals 110, and may transmit data to a server that provides an application service.

Since a vast number of terminal devices is considered in the LoRa network, a relatively high data rate is desirable.

Generally, a transmitter generates a transmission signal based on data that is desired to be represented. Such a process is referred to as a "modulation." Well-known modulation techniques include, for example, frequency shift keying (FSK), phase shift keying (PSK), amplitude shift keying (ASK), orthogonal frequency-division multiplexing (OFDM), and the like. In a LoRa, a chirp spread spectrum (CSS) for a modulation is utilized. A signal modulated by the CSS has a greatest feature that a frequency of the signal linearly increases or decreases. A signal with an increasing frequency is referred to as an "up-chirp signal" and a signal with a decreasing frequency is referred to as a "down-chirp signal." Due to such a change in frequency, a reliability of a signal may increase and a feature robust against a Doppler effect may be provided.

FIGS. 2A and 2B illustrate waveforms of an up-chirp signal and a down-chirp signal in a time domain.

FIG. 2A illustrates a waveform of the up-chirp signal in the time domain, and FIG. 2B illustrates a waveform of the down-chirp signal in the time domain.

A signal modulated by a CSS has a greatest feature that a frequency of the signal changes, and accordingly when a signal is analyzed in a frequency domain as shown in FIGS. 3A and 3B instead of the time domain of FIGS. 2A and 2B, a characteristic of a signal may be more clearly understood.

FIGS. 3A and 3B illustrate waveforms of an up-chirp signal and a down-chirp signal in a frequency domain.

FIG. 3A illustrates a waveform of the up-chirp signal in the frequency domain, and FIG. 3B illustrates a waveform of the down-chirp signal in the frequency domain.

In a LoRa, uses of an up-chirp signal and a down-chirp signal may be distinguished from each other. The up-chirp signal may be used to represent data, and the down-chirp signal may be used when received data is demodulated (that is, during a process of predicting which data is transmitted).

FIGS. 4A, 4B and 4C illustrate an example of a change in a frequency of an up-chirp signal for a transmission based on data in a frequency domain.

FIGS. 4A, 4B and 4C illustrate an example of transmitting data 0, an example of transmitting data 1, and an example of transmitting data 5, respectively, under a condition of sending one of eight pieces of data in total, for example, data 0, 1, 2, 3, 4, 5, 6 and 7, using one up-chirp signal.

As shown in FIGS. 4A through 4C, to verify which signal is transmitted, only a point at which a frequency of a signal starts needs to be verified. The point may be easily known by multiplying a transmitted up-chirp signal by a down-chirp signal and performing a Fourier transform on a multiplication result. The above process is performed when a demodulation is performed in a receiver of a LoRa.

A CSS modulation technique is useful in terms of a reliability of a signal, but, has a low data rate. Thus, there is a desire for a CSS modulation technique for providing a higher data rate.

SUMMARY

Example embodiments provide a Long Range (LoRa) communication system with an improved data rate and method thereof.

Example embodiments provide a method of transmitting data at a data rate twice an existing data rate by converting n-th data of a packet to an up-chirp signal, by converting (n+1)-th data of the packet to a down-chirp signal and by transmitting a signal generated by adding the up-chirp signal and the down-chirp signal, and thus data may be transmitted at an improved data rate in a transmission device of a LoRa communication system.

Example embodiments provide a method of receiving data at a data rate twice an existing data rate by acquiring n-th data of a packet by performing a fast Fourier transform (FFT) on a result obtained by multiplying a down-chirp signal and a reception signal, and by acquiring (n+1)-th data of the packet by performing an FFT on a result obtained by multiplying an up-chirp signal and the reception signal, when a signal is received using a method with an improved data rate, and thus data may be received at an improved data rate in a reception device of a LoRa communication system.

According to an aspect, there is provided a method of transmitting data in a transmission device of a LoRa communication system, the method including receiving a packet that is to be transmitted, determining a transmission scheme, transmitting a preamble signal indicating that a packet is to be transmitted using an enhanced transmission scheme when the determined transmission scheme is the enhanced transmission scheme, converting n-th data of the packet to an up-chirp signal, converting (n+1)-th data of the packet to a down-chirp signal, and generating a transmission signal by adding the n-th data converted to the up-chirp signal and the (n+1)-th data converted to the down-chirp signal, and transmitting the transmission signal to a reception device.

The up-chirp signal and the down-chirp signal may have different chirp rates.

The determining of the transmission scheme may include determining the transmission scheme to be the enhanced transmission scheme when a state of a communication link is greater than or equal to a preset reference value.

The determining of the transmission scheme may include receiving information about the transmission scheme from the reception device and determining the transmission scheme.

According to another aspect, there is provided a method of receiving data in a reception device of a LoRa communication system, the method including receiving, from a transmission device, a preamble signal indicating that a packet is to be transmitted using an enhanced transmission scheme, receiving a reception signal, generating a preset down-chirp signal, acquiring n-th data of the packet by performing an FFT on a result obtained by multiplying the preset down-chirp signal by the reception signal, generating a preset up-chirp signal, and acquiring (n+1)-th data of the packet by performing an FFT on a result obtained by multiplying the preset up-chirp signal by the reception signal.

The reception signal may be a signal generated by adding n-th data converted to an up-chirp signal and (n+1)-th data converted to a down-chirp signal.

The preset up-chirp signal and the preset down-chirp signal may have different chirp rates.

The method of receiving data may further include measuring a signal-to-noise ratio (SNR) based on a signal received from the transmission device, and determining that a state of a communication link with the transmission device is good and providing the state of the communication link to the transmission device, when the measured SNR is greater than or equal to a reference value.

The providing of the state of the communication link may include transmitting the state of the communication link to the transmission device using an acknowledgement (ACK) packet or a separate instruction packet.

According to another aspect, there is provided a transmission device of a LoRa communication system, the transmission device including a determiner configured to determine whether to transmit a packet using an enhanced transmission scheme, a synchronizer configured to transmit a preamble signal indicating that a packet is to be transmitted using the enhanced transmission scheme when a determined transmission scheme is the enhanced transmission scheme, an up-chirp converter configured to convert n-th data of the packet to an up-chirp signal, a down-chirp converter configured to convert (n+1)-th data of the packet to a down-chirp signal, an adder configured to generate a transmission signal by adding the n-th data converted to the up-chirp signal and the (n+1)-th data converted to the down-chirp signal, and a transmitter configured to transmit the transmission signal to a reception device.

The determiner may be configured to receive information about the transmission scheme from the reception device and determine the transmission scheme.

According to another aspect, there is provided a reception device of a LoRa communication system, the reception device including a synchronizer configured to receive, from a transmission device, a preamble signal indicating that a packet is to be transmitted using an enhanced transmission scheme, a receiver configured to receive a reception signal, a down-chirp signal generator configured to generate a preset down-chirp signal when the reception signal is received, a first multiplier configured to multiply the preset down-chirp signal by the reception signal, a first FFT performer configured to acquire n-th data of the packet by performing an FFT on a result output from the first multiplier, an up-chirp signal generator configured to generate a preset up-chirp signal when the reception signal is received, a second multiplier configured to multiply the preset up-chirp signal by the reception signal, and a second FFT performer configured to acquire (n+1)-th data of the packet by performing an FFT on a result output from the second multiplier.

The reception device may further include a link determiner configured to measure an SNR based on a signal received from the transmission device, configured to determine that a state of a communication link with the transmission device is good and configured to provide the state of the communication link to the transmission device, when the measured SNR is greater than or equal to a reference value.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
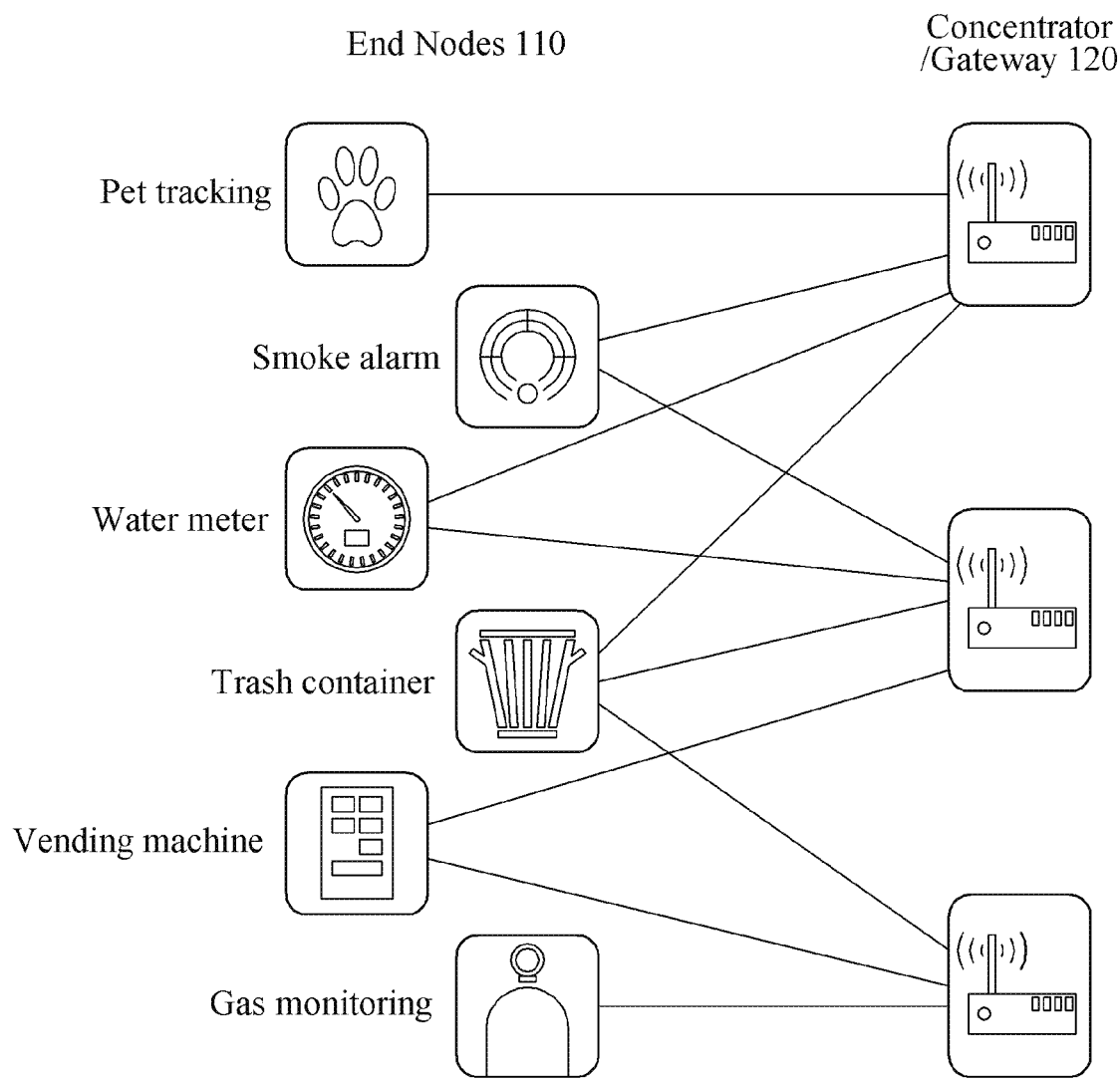
FIG. 1 is a diagram illustrating a structure of a portion of a Long Range (LoRa) network according to a related art.
Figure 2A:
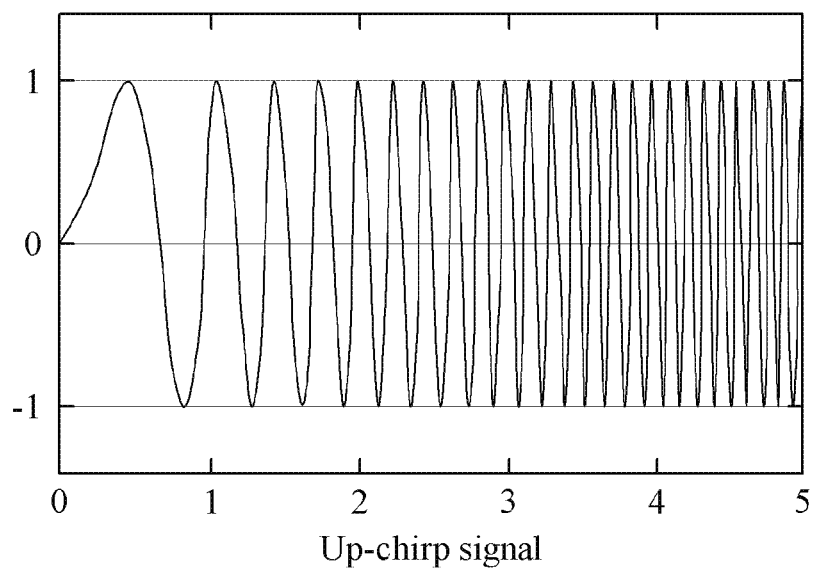
FIGS. 2A and 2B illustrate waveforms of an up-chirp signal and a down-chirp signal in a time domain according to a related art.
Figure 2B:
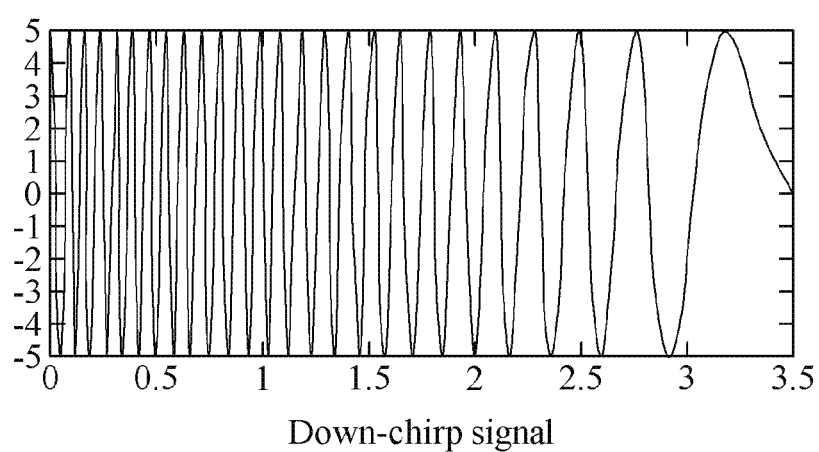
Figure 3A:
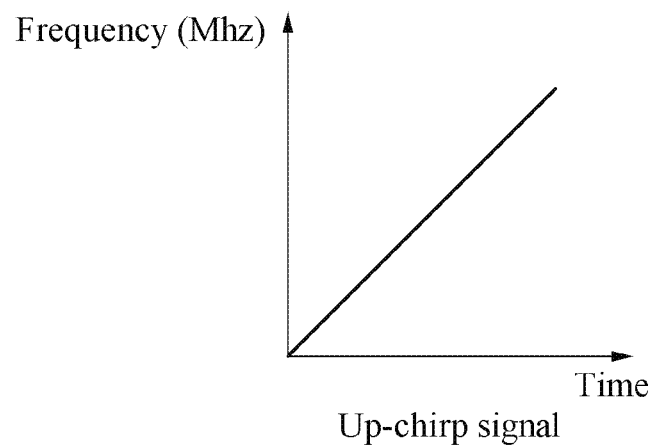
FIGS. 3A and 3B illustrate waveforms of an up-chirp signal and a down-chirp signal in a frequency domain according to a related art.
Figure 3B:
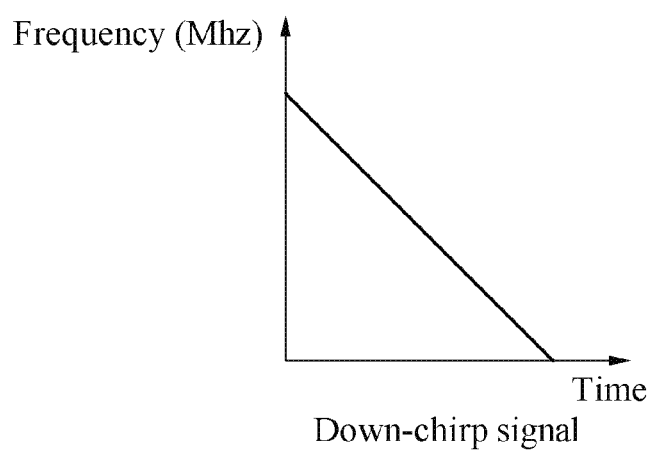
Figure 4A:
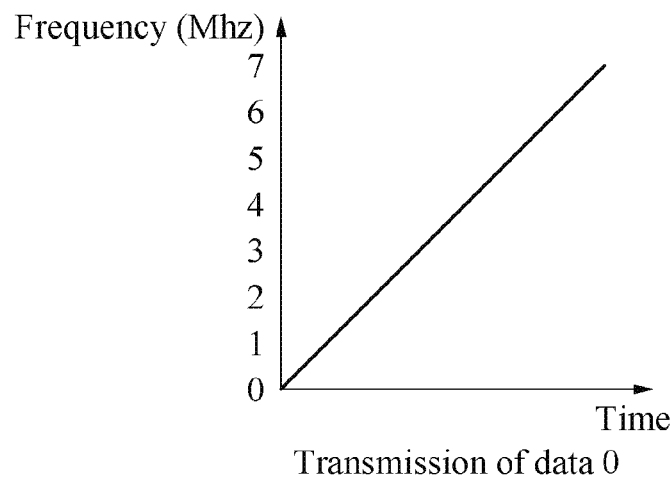
FIGS. 4A, 4B and 4C illustrate an example of a change in a frequency of an up-chirp signal for a transmission based on data in a frequency domain according to a related art.
Figure 4B:
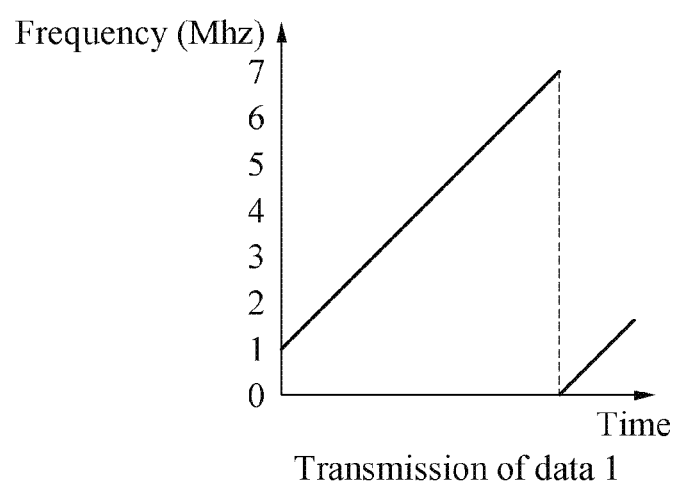
Figure 4C:
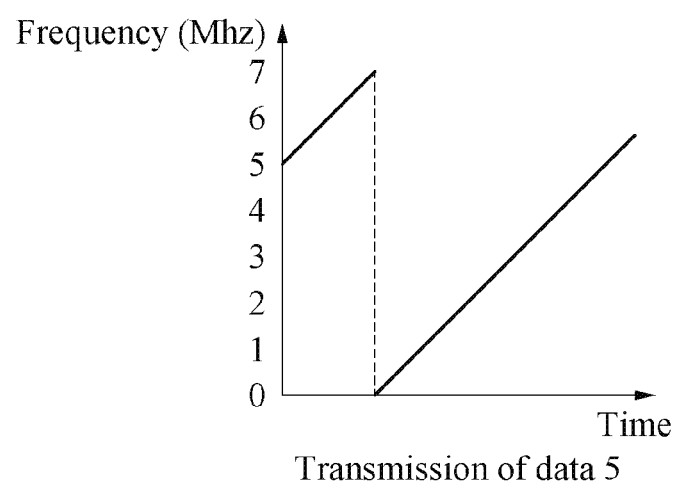

Hereinafter, example embodiments will be described in detail with reference to the accompanying drawings. Various modifications may be made to example embodiments. However, it should be understood that these embodiments are not construed as limited to the illustrated forms and include all changes, equivalents or alternatives within the idea and the technical scope of this disclosure.

The terminology used herein is for the purpose of describing example embodiments only and is not intended to be limiting of example embodiments. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When describing the example embodiments with reference to the accompanying drawings, like reference numerals refer to like constituent elements and a repeated description related thereto will be omitted. When it is determined detailed description related to a related known function or configuration they may make the purpose of the example embodiments unnecessarily ambiguous in describing the example embodiments, the detailed description will be omitted here.

Figure 5:
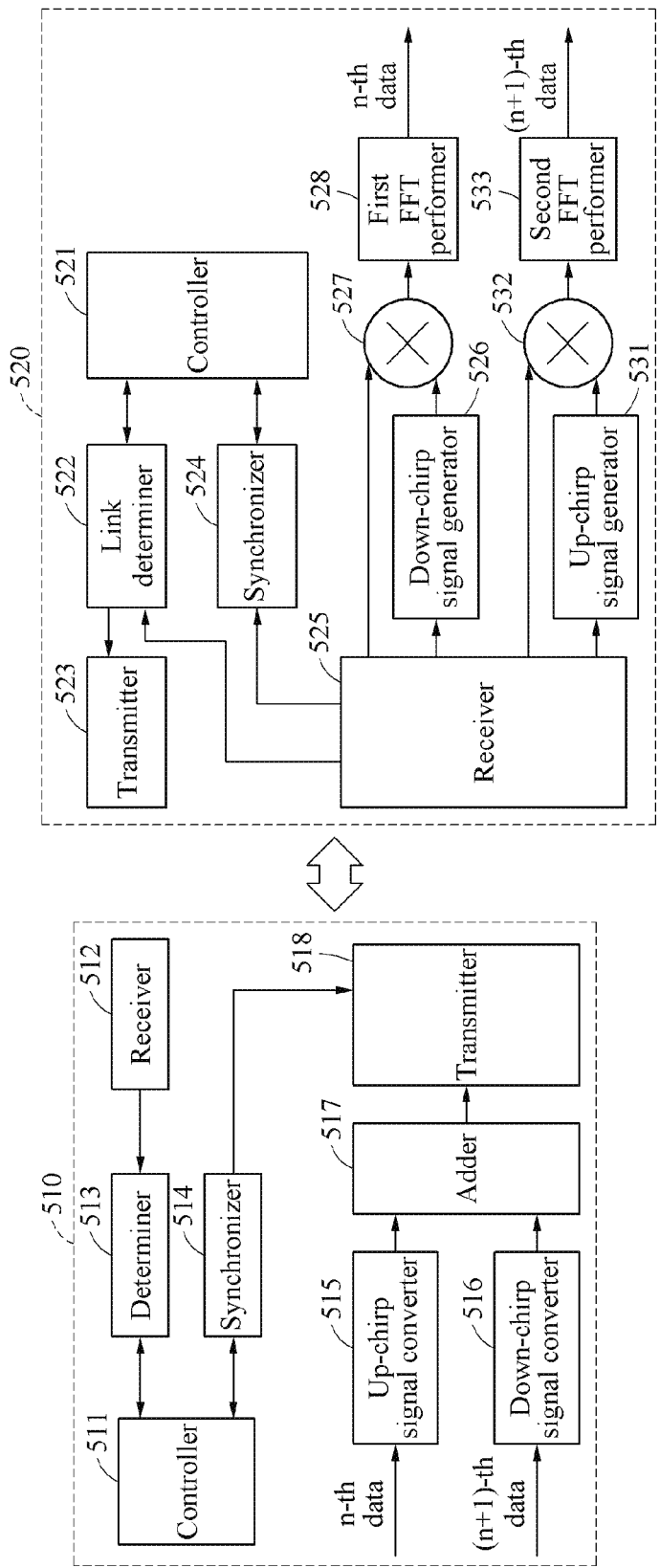
FIG. 5 illustrates a configuration of a LoRa communication system according to an example embodiment.

FIG. 5 is a diagram illustrating a configuration of a Long Range (LoRa) communication system according to an example embodiment.

Referring to FIG. 5, a LoRa communication system with an improved data rate according to an example embodiment may include a transmission device 510 and a reception device 520.

The transmission device 510 may be included in a terminal of a LoRa network, and the reception device 520 may be included in a gateway of the LoRa network.

The transmission device 510 may transmit data at an improved data rate using a controller 511, a receiver 512, a determiner 513, a synchronizer 514, an up-chirp signal converter 515, a down-chirp signal converter 516, an adder 517 and a transmitter 518.

The receiver 512 may receive a signal from the reception device 520. For example, the receiver 512 may receive an acknowledgement (ACK) packet or an instruction packet from the reception device 520.

The determiner 513 may determine whether to transmit a data using an enhanced transmission scheme.

The determiner 513 may receive information associated with a determination result of a state of a LoRa communication link from the reception device 520 through the receiver 512, and may determine, based on the received information, whether to use the enhanced transmission scheme. For example, the received information may be information about whether the state of the LoRa communication link is good, or information about whether to apply the enhanced transmission scheme. The received information may be received using an ACK packet or an instruction packet.

The determiner 513 may directly determine a state of a LoRa communication link with the reception device 520. When the state of the LoRa communication link is determined to be good (for example, when a measured signal-to-noise ratio (SNR) is greater than or equal to a reference value), the determiner 513 may determine the enhanced transmission scheme as a transmission scheme. When the state of the LoRa communication link is not good, the determiner 513 may determine an existing transmission scheme as a transmission scheme.

The synchronizer 514 may perform a synchronization with the reception device 520.

For the synchronization with the reception device 520, the synchronizer 514 may transmit a preamble signal to the reception device 520 through the transmitter 518.

When the existing transmission scheme is determined as a transmission scheme by the determiner 513, the synchronizer 514 may transmit an existing preamble signal. When a transmission scheme with an improved data rate according to an example embodiment is determined as a transmission scheme by the determiner 513, the synchronizer 514 may transmit a preset preamble signal indicating that a packet is to be transmitted using the transmission scheme with the improved data rate.

The up-chirp signal converter 515 may convert n-th data of a packet that is to be transmitted to an up-chirp signal.

The down-chirp signal converter 516 may convert (n+1)-th data of a packet that is to be transmitted to a down-chirp signal.

The adder 517 may generate a transmission signal by adding the n-th data converted to the up-chirp signal and the (n+1)-th data converted to the down-chirp signal.

The transmitter 518 may transmit the transmission signal to the reception device 520. The up-chirp signal and the down-chirp signal may have different chirp rates.

Transmitting of a signal generated by adding an up-chip signal and a down-chirp signal is effective, because one of greatest features of a chirp signal is that two signals are almost orthogonal when chirp rates that determine a shape of a signal are different from each other. Since the two orthogonal signals do not affect each other although the two signals overlap during a demodulation in a reception device, the signal generated by adding the up-chirp signal and the down-chirp signal may also be demodulated in the reception device.

Figure 6A:
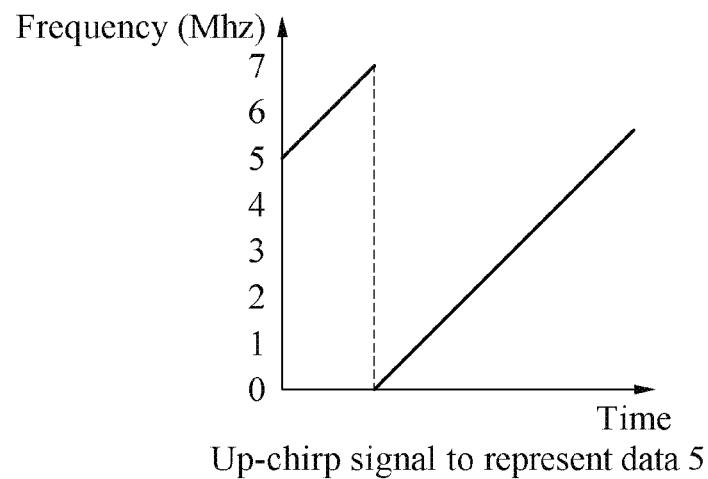
FIGS. 6A and 6B illustrate examples of representing data using an up-chirp signal and a down-chirp signal in a transmission device according to an example embodiment.
Figure 6B:
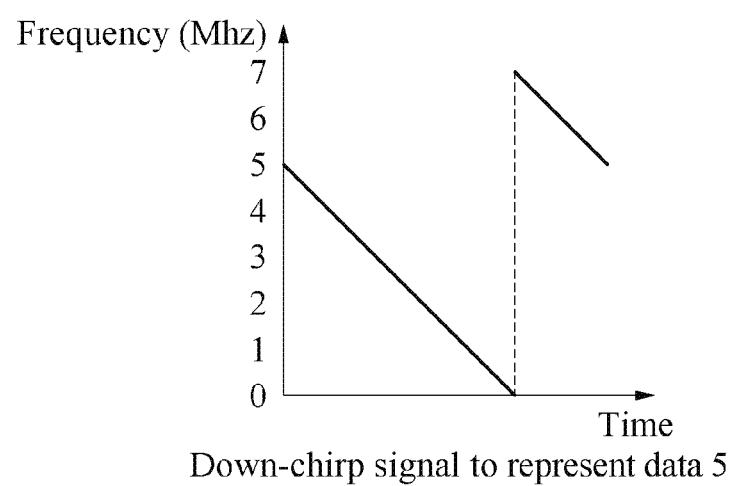

FIGS. 6A and 6B illustrate examples of representing data using an up-chirp signal and a down-chirp signal in a transmission device according to an example embodiment.

FIG. 6A illustrates an example in which n-th data of a packet to be transmitted is converted to an up-chirp signal by the up-chirp signal converter 515 when the n-th data is 5. FIG. 6B illustrates an example in which (n+1)-th data of a packet to be transmitted is converted to a down-chirp signal when the (n+1)-th data is 5.

Figure 7A:
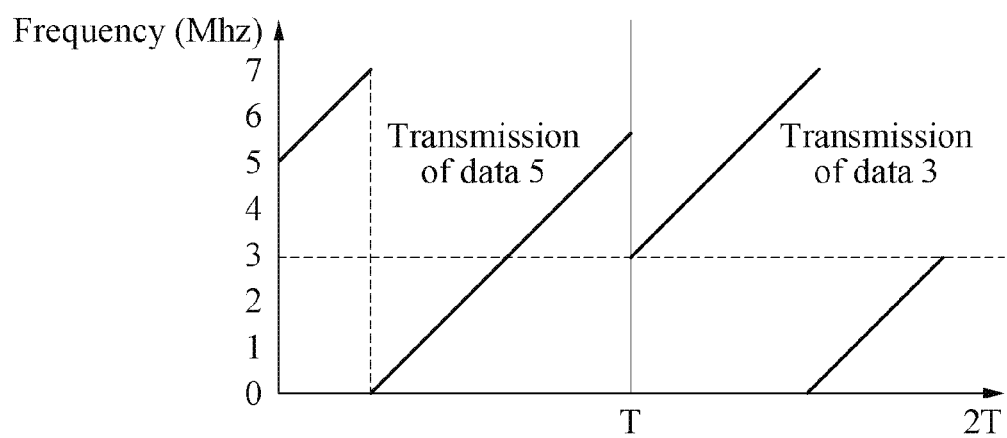
FIGS. 7A and 7B are graphs for a comparison between an example of transmitting data using an existing method and an example of transmitting data in a transmission device according to an example embodiment.
Figure 7B:
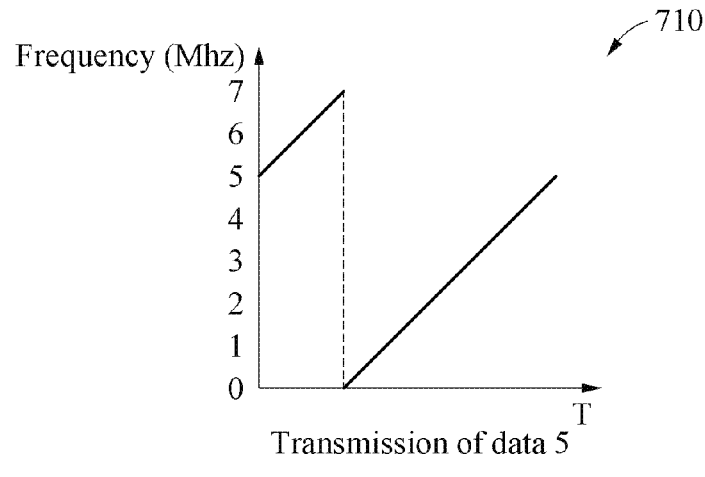
Figure 7B:
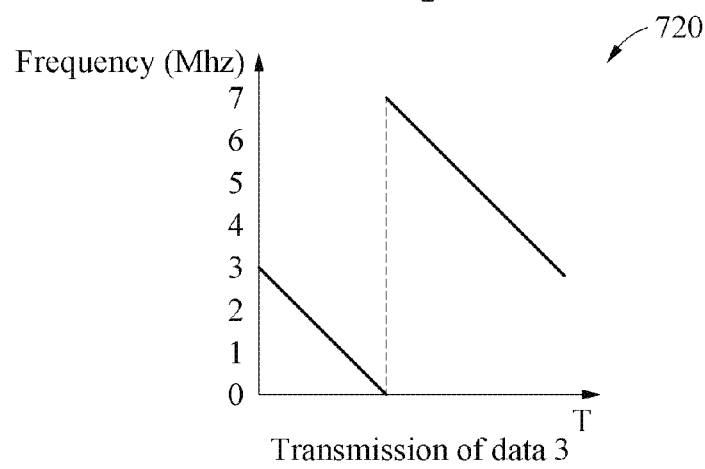
Figure 7B:
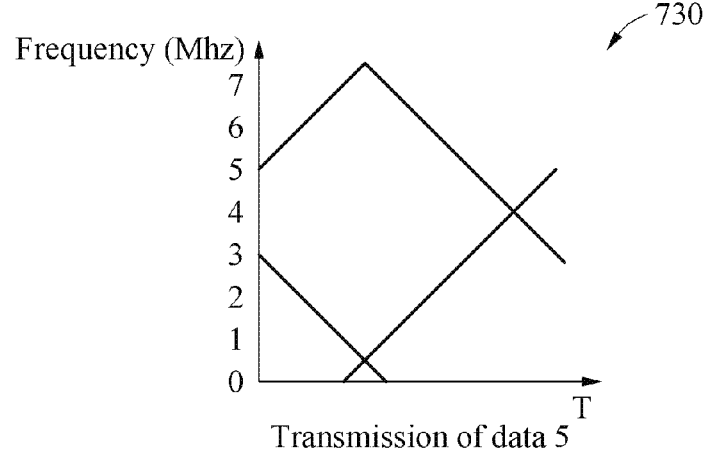

FIGS. 7A and 7B are graphs for a comparison between an example of transmitting data using an existing method and an example of transmitting data in a transmission device according to an example embodiment.

FIG. 7A illustrates waveforms of signals in a frequency domain when data 5 and 3 are transmitted using an existing LoRa transmission scheme.

FIG. 7B illustrates waveforms of signals in a frequency domain when data 5 and 3 are transmitted using a transmission scheme with an improved data rate according to an example embodiment.

Referring to FIG. 7A, it is confirmed that the existing LoRa transmission scheme requires a time of 2T to transmit the data 5 and 3.

Referring to FIG. 7B, it is confirmed that the transmission scheme with the improved data rate requires a time of 1T to transmit the data 5 and 3, because an up-chirp signal 710 converted by the up-chirp signal converter 515 and a down-chirp signal 720 converted by the down-chirp signal converter 516 are simultaneously generated and combined to generate a transmission signal 730.

Referring back to FIG. 5, the controller 511 of the transmission device 510 may control an overall operation of the transmission device 510 and each of components included in the transmission device 510. For example, the controller 511 may include at least one of the determiner 513 and the synchronizer 514.

For example, when the existing transmission scheme is determined by the determiner 513, the controller 511 may control the down-chirp signal converter 516 not to operate.

The reception device 520 may receive data at an improved data rate using a controller 521, a link determiner 522, a transmitter 523, a synchronizer 524, a receiver 525, a down-chirp signal generator 526, a first multiplier 527, a first fast Fourier transform (FFT) performer 528, an up-chirp signal generator 531, a second multiplier 532, and a second FFT performer 533.

The link determiner 522 may receive a signal from the transmission device 510 through the receiver 525 and may measure an SNR. When the measured SNR is greater than or equal to a reference value, the link determiner 522 may determine that a state of a communication link with the transmission device 510 is good, and may provide the state of the communication link to the transmission device 510 through the transmitter 523.

For example, an ACK packet or a separate instruction packet may be used to provide information about the state of the communication link to the transmission device 510. In this example, the information about the state of the communication link may indicate whether the state of the communication link is good, or whether the enhanced transmission scheme is available. Also, the information about the state of the communication link may be provided using a reserved field of the ACK packet or instruction packet.

The transmitter 523 may transmit a signal to the transmission device 510. For example, the transmitter 523 may transmit an ACK packet or an instruction packet to the transmission device 510.

The synchronizer 524 may receive a preamble signal from the transmission device 510 through the receiver 525.

The preamble signal may be used to determine whether a packet is to be transmitted using a transmission scheme with an improved data rate according to an example embodiment.

For example, when the existing LoRa transmission scheme is used to transmit a packet, the same signal as the existing preamble signal may be received. When the transmission scheme with the improved data rate is used to transmit a packet, a newly preset preamble signal may be received.

The receiver 525 may receive a reception signal and a preamble signal for a synchronization from the transmission device 510.

The down-chirp signal generator 526 may generate a preset down-chirp signal when a reception signal is received by the receiver 525.

The first multiplier 527 may multiply the preset down-chirp signal and the reception signal.

The first FFT performer 528 may acquire data of a packet by performing an FFT on a result output from the first multiplier 527.

For example, when the reception signal is a reception signal generated by the transmission scheme with the improved data rate, the first FFT performer 528 may acquire n-th data of the packet by performing an FFT on the result output from the first multiplier 527.

The up-chirp signal generator 531 may generate a preset up-chirp signal when a reception signal generated by the transmission scheme with the improved data rate is received by the receiver 525.

The second multiplier 532 may multiply the preset up-chirp signal and the reception signal.

The second FFT performer 533 may acquire (n+1)-th data of the packet by performing an FFT on a result output from the second multiplier 532.

The controller 521 may control an overall operation of the reception device 520 and each of components included in the reception device 520. For example, the controller 521 may include at least one of the link determiner 522 and the synchronizer 524.

For example, when data is transmitted by the existing transmission scheme, the controller 521 may control the up-chirp signal generator 531, the second multiplier 532 and the second FFT performer 533 not to operate, based on whether a packet is transmitted by a transmission scheme with an improved data rate verified using the synchronizer 524.

Figure 8:
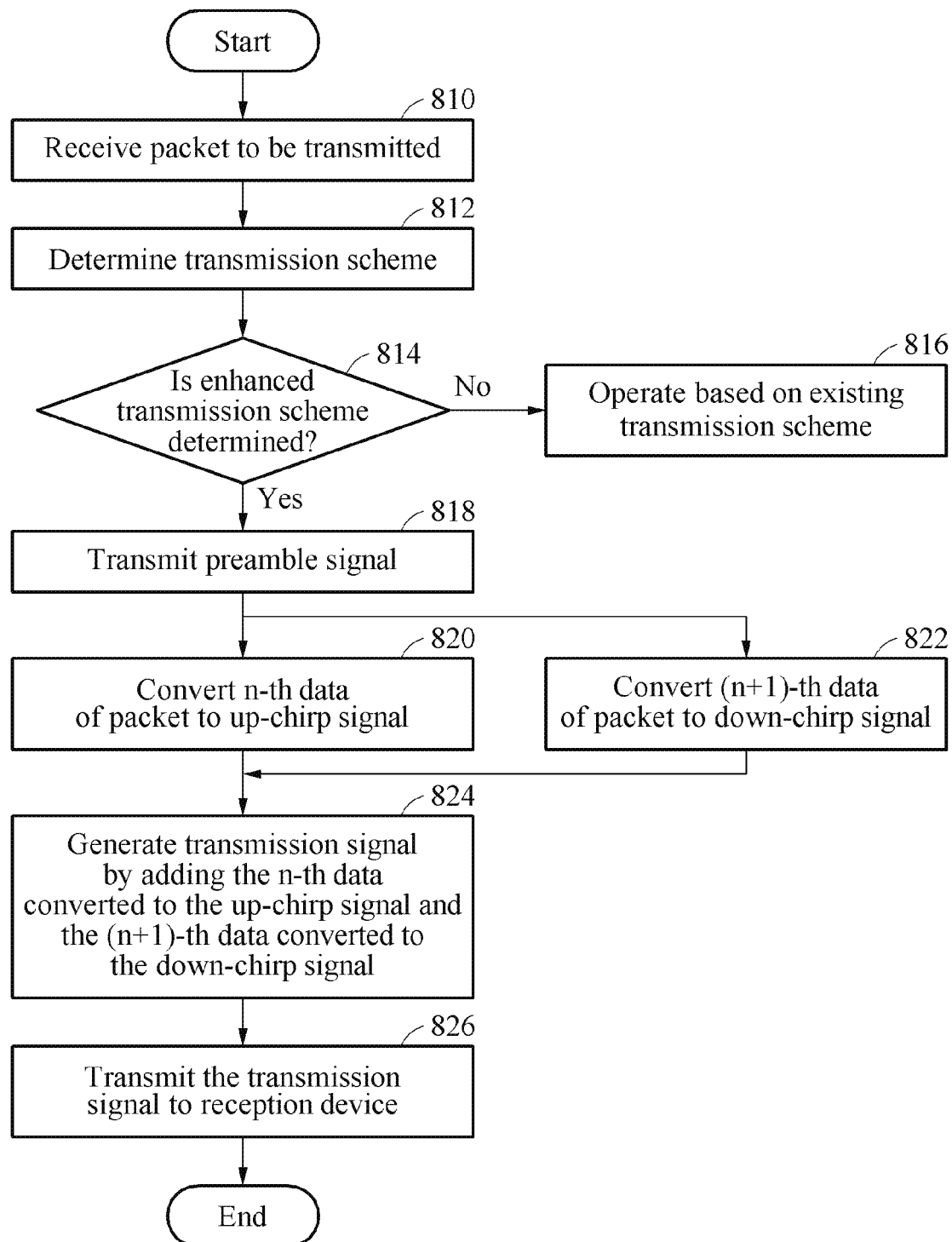
FIG. 8 is a flowchart illustrating a process of transmitting data at an improved data rate in a transmission device of a LoRa communication system according to an example embodiment.

FIG. 8 is a flowchart illustrating a process of transmitting data at an improved data rate in a transmission device of a LoRa communication system according to an example embodiment.

Referring to FIG. 8, when a packet that is to be transmitted is received in operation 810, the transmission device 510 determines whether to use an existing transmission scheme or an enhanced transmission scheme in operation 812.

In operation 812, the transmission device 510 may determine a state of a LoRa communication link with the reception device 520. When a determination result indicates that the state of the LoRa communication link is good (for example, a measured SNR is greater than or equal to a reference value), the enhanced transmission scheme may be determined as a transmission scheme. When the state of the LoRa communication link is not good, the existing transmission scheme may be determined.

The transmission device 510 may directly determine the state of the LoRa communication link, or may receive a result obtained by determining the state of the LoRa communication link from the reception device 520. The transmission device 510 may receive information about the state of the LoRa communication link based on an ACK packet or a separate instruction packet received from the reception device 520. The information about the state of the LoRa communication link received from the reception device 520 may be information about whether the state of the LoRa communication link is good, or information about whether to apply the enhanced transmission scheme.

When the enhanced transmission scheme is not determined as a transmission scheme in operation 814, the transmission device 510 may transmit a preamble signal and transmit data by only a conversion to an up-chirp signal based on the existing transmission scheme in operation 816.

When the enhanced transmission scheme is determined as a transmission scheme in operation 814, the transmission device 510 may transmit a preamble signal indicating that a packet is to be transmitted using the enhanced transmission scheme in operation 818.

In operation 820, the transmission device 510 converts n-th data of the packet to an up-chirp signal.

In operation 822, the transmission device 510 converts (n+1)-th data of the packet to a down-chirp signal.

In operation 824, the transmission device 510 generates a transmission signal by adding the n-th data converted to the up-chirp signal and the (n+1)-th data converted to the down-chirp signal.

In operation 826, the transmission device 510 transmits the transmission signal to the reception device 520.

Operations 820 through 826 may be repeatedly performed until a transmission of the packet is completed.

Figure 9:
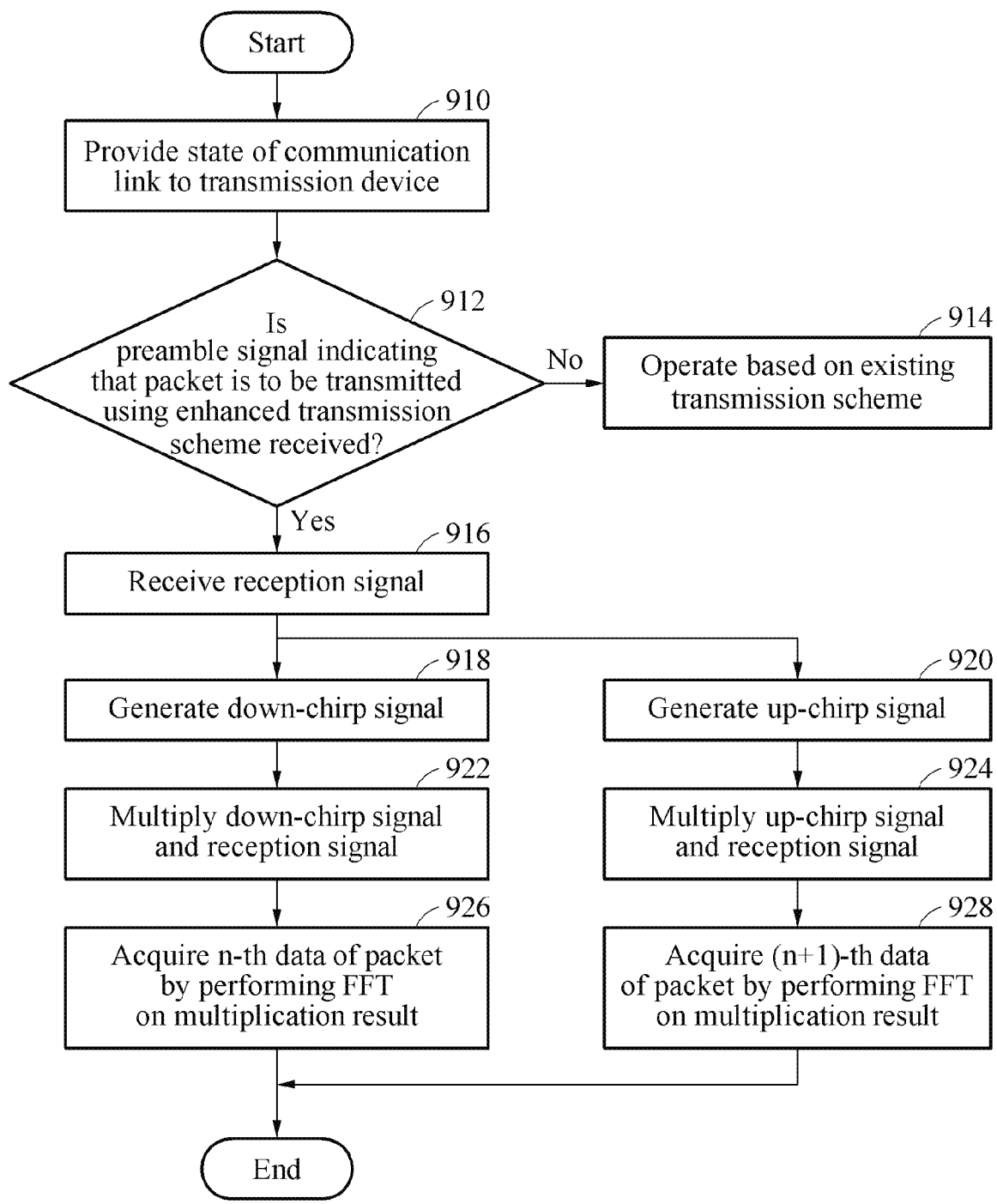
FIG. 9 is a flowchart illustrating a process of receiving data at an improved data rate in a reception device of a LoRa communication system according to an example embodiment.

FIG. 9 is a flowchart illustrating a process of receiving data at an improved data rate in a reception device of a LoRa communication system according to an example embodiment. Referring to FIG. 9, in operation 910, the reception device 520 verifies a state of a communication link and provides the state of the communication link to the transmission device 510. Also, the reception device 520 may provide information about whether an enhanced transmission scheme is available to the transmission device 510.

To provide the state of the communication link to the transmission device 510 in operation 910, information about the state of the communication link may be included in an ACK packet and transmitted to the transmission device 510, or may be included and transmitted through a separate instruction packet. Operation 910 is not necessarily required, and thus will be omitted.

When a preamble signal indicating that a packet is to be transmitted using the existing transmission scheme instead of using the enhanced transmission scheme is received in operation 912, the reception device 520 may convert a received signal using a down-chirp signal, may perform an FFT on a result obtained by multiplying a converted signal and a reception signal, and may sequentially acquire one piece of data at a time, based on the existing transmission scheme in operation 914.

When a preamble signal indicating that a packet is to be transmitted using the enhanced transmission scheme is received in operation 912, the reception device 520 may receive a reception signal from the transmission device 510 in operation 916.

The reception device 520 generates a preset down-chirp signal in operation 918, and generates a preset up-chirp signal in operation 920.

The reception device 520 multiplies the preset down-chirp signal and the reception signal in operation 922, and multiplies the preset up-chirp signal and the reception signal in operation 924.

In operation 926, the reception device 520 acquires n-th data of the packet by performing an FFT on a multiplication result of the preset down-chirp signal and the reception signal. In operation 928, the reception device 520 acquires (n+1)-th data of the packet by performing an FFT on a multiplication result of the preset up-chirp signal and the reception signal.

Operations 914 through 926 may be repeatedly performed until a reception of the packet is completed.

According to example embodiments, in a LoRa communication system with an improved data rate and method thereof, a transmission device may transmit data at a data rate twice an existing data rate by converting n-th data of a packet to an up-chirp signal, by converting (n+1)-th data of the packet to a down-chirp signal and by transmitting a signal generated by adding the up-chirp signal and the down-chirp signal.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of receiving data in a reception device of a Long Range (LoRa) communication system, the method comprising:
   receiving, from a transmission device, a preamble signal indicating that a packet is to be transmitted using an enhanced transmission scheme;
   receiving a reception signal;
   generating a preset down-chirp signal;
   acquiring n-th data of the packet by performing a fast Fourier transform (FFT) on a result obtained by multiplying the preset down-chirp signal by the reception signal;
   generating a preset up-chirp signal; and acquiring (n+1)-th data of the packet by performing an FFT on a result obtained by multiplying the preset up-chirp signal by the reception signal, wherein the 'n' is a positive integer.

2. The method of claim 1, wherein the reception signal is a signal generated by adding n-th data converted to an up-chirp signal and (n+1)-th data converted to a down-chirp signal.

3. The method of claim 1, wherein the preset up-chirp signal and the preset down-chirp signal have different chirp rates.

4. The method of claim 1, further comprising:

measuring a signal-to-noise ratio (SNR) based on a signal received from the transmission device; and determining that a state of a communication link with the transmission device is good and providing the state of the communication link to the transmission device, when the measured SNR is greater than or equal to a reference value.

5. The method of claim 4, wherein the providing of the state of the communication link comprises transmitting the state of the communication link to the transmission device using an acknowledgement (ACK) packet or a separate instruction packet.

6. A reception device of a Long Range (LoRa) communication system, the reception device comprising:

a synchronizer configured to receive, from a transmission device, a preamble signal indicating that a packet is to be transmitted using an enhanced transmission scheme;

a receiver configured to receive a reception signal;

a down-chirp signal generator configured to generate a preset down-chirp signal when the reception signal is received;

a first multiplier configured to multiply the preset down-chirp signal by the reception signal;

a first fast Fourier transform (FFT) performer configured to acquire n-th data of the packet by performing an FFT on a result output from the first multiplier;

an up-chirp signal generator configured to generate a preset up-chirp signal when the reception signal is received;

a second multiplier configured to multiply the preset up-chirp signal by the reception signal; and a second FFT performer configured to acquire (n+1)-th data of the packet by performing an FFT on a result output from the second multiplier, wherein the 'n' is a positive integer.

7. The reception device of claim 6, further comprising:

a link determiner configured to measure a signal-to-noise ratio (SNR) based on a signal received from the transmission device, configured to determine that a state of a communication link with the transmission device is good and configured to provide the state of the communication link to the transmission device, when the measured SNR is greater than or equal to a reference value.

* * * * *